United States Patent [19]

Gehrmann

[11] Patent Number: 4,760,454
[45] Date of Patent: Jul. 26, 1988

[54] EQUILIBRATION METHOD FOR ELECTRICAL FOCUSSING OF TELEVISION CAMERA TUBES

[75] Inventor: Rainer Gehrmann, Alsbach-Hähnlein, Fed. Rep. of Germany

[73] Assignee: Robert Bosch GmbH, Stuttgart, Fed. Rep. of Germany

[21] Appl. No.: 937,216

[22] Filed: Dec. 3, 1986

[30] Foreign Application Priority Data

Dec. 4, 1985 [DE] Fed. Rep. of Germany ....... 3542758

[51] Int. Cl.⁴ ............................................ H04N 5/228
[52] U.S. Cl. ..................................... 358/218; 358/217
[58] Field of Search ........................ 358/211, 217–219; 250/211 J, 213 VT, 492.2

[56] References Cited

U.S. PATENT DOCUMENTS

| | | | |
|---|---|---|---|
| 2,402,053 | 6/1946 | Kell | 358/211 |
| 2,700,066 | 1/1955 | Vorms | 358/217 |
| 3,710,018 | 1/1973 | Ryley et al. | 358/218 |
| 3,716,657 | 2/1973 | Niemyer, Jr. | 358/218 |
| 4,503,466 | 3/1985 | Ryan | 358/219 |
| 4,593,321 | 6/1986 | Blom et al. | 358/219 |
| 4,595,955 | 6/1986 | Groves et al. | 358/217 |

Primary Examiner—Jin F. Ng
Assistant Examiner—Stephen Brinich
Attorney, Agent, or Firm—Frishauf, Holtz, Goodman & Woodward

[57] ABSTRACT

With the signal electrode of a camera tube uniformly illuminated by diffuse light, scanning of the signal electrode by the electron beam is caused to leave unaffected certain lines or parts of lines which are scanned in the next frame. This may be done by blanking the beam out for a field, a line or part of a line in every two frames, or by shifting the lines of one field to superimpose them on those of the other field for a corresponding interval in every two frames. The video signal occurring when a previously unscanned line or line portion is first scanned is measured and compared with the previous measured value, in response to which the setting of the focussing control is shifted towards a smaller beam spot for a renewed measurement. When the signal rises to a higher magnitude, which would approximate twice the video signal of a normal scan, in the ideal case, the setting procedure is complete.

26 Claims, 2 Drawing Sheets

EQUILIBRATION METHOD FOR ELECTRICAL FOCUSSING OF TELEVISION CAMERA TUBES

The invention concerns focussing the electron beam in a television camera tube by an equilibration method involving a repetition of a procedure for reaching the desired adjustment.

For focus adjustment of the electron beam of television camera tubes, it has heretofore been the practice to utilize a planar optical aid, such as a test picture which is projected through the objective lens of the camera onto the signal electrode of the camera tube, and then to show the video signal derived therefrom on the picture screen of a monitor or of a camera finder and also to display the corresponding oscillogram on an oscilloscope. With the help of such a display, the so-called focus control was then manually set in such a way that the picked-up test picture is reproduced as sharply as possible. In cases in which the objective lens of the camera was not optimally set, the adjustment of the electrical focussing was adjusted anew after optimizing the lens setting. This known electrical focus adjustment was accordingly troublesome and time-consuming.

SUMMARY OF THE INVENTION

It is an object of the present invention to provide a method for correctly setting the electrical focus of the camera tube without optical aids which is to a great extent automated, so that it is quick and reliable.

Briefly, the signal electrode of the camera tube is illuminated with diffuse light, the electron beam is imtermittently suppressed during scanning, so that a charge builds up where there was no incident beam. The built-up charge will be disturbed more or less by the more or less defocussed beam spot of the scanning beam in the following and neighboring picture parts (especially the following picture field). At certain intervals the suppression of the electron beam is omitted to produce a video signal where a charge has built up. That video signal is measured, compared with a measurementvalue from the previous scan for determining a maximum or a minimum, and a control adjustment value is then provided to the electrical focus control of the camera tube in the sense of reducing the size of the beam spot. This procedure is repeated a few times after each focussing adjustment.

In a first embodiment of the method, intermittent suppression of the beam is performed in alternate fields or alternate lines, so that when the alternation of beam scan and beam suppression is changed to scan a line not previously scanned, the video signal measurement value will be reduced if the focussing is poor and will be increased as the focussing is improved. In another embodiment, the scanning pattern of one field is intermittently offset to superimpose it on the scanning pattern of another field, either line-by-line or field-by-field, so that some line or lines are not scanned and the offsetting is omitted to read the video signal.

In another embodiment, the electron beam is suppressed over a portion of a line and the video signal immediately following that portion is measured and processed, in which case a minimum video signal corresponds to the best focussing.

The method of the invention has the advantage that not only are no optical aids, monitor displays or oscilloscopes necessary, but it is not even necessary to have a lens on the camera for setting the electrical focussing.

The invention is described in considerably more detail in the description that follows.

BRIEF DESCRIPTION OF THE DRAWINGS

The invention is further described by way of illustrative example with reference to the annexed drawings, in which.

DESCRIPTION OF THE ILLUSTRATED EMBODIMENTS OF THE METHOD

Figure 1:
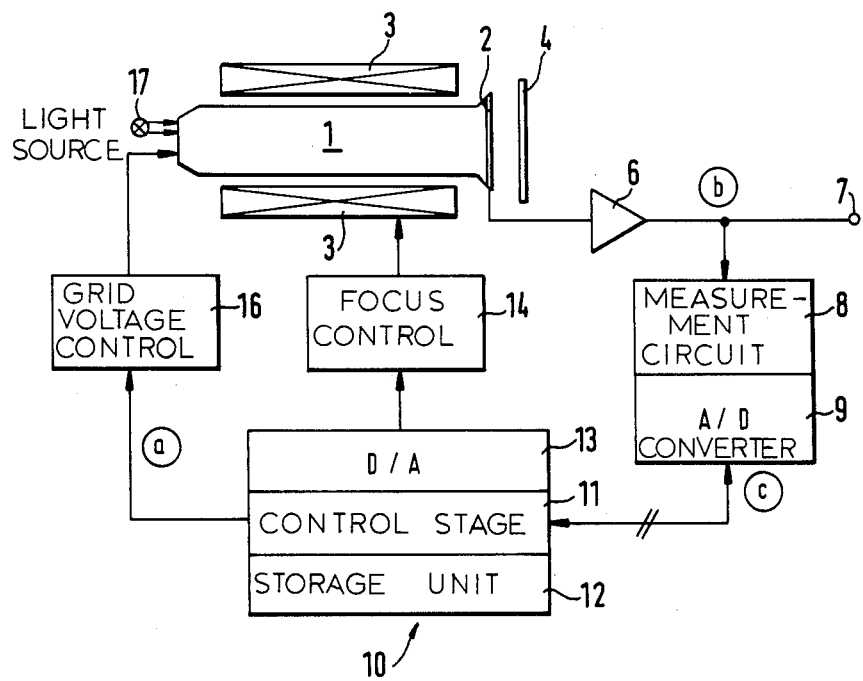
FIG. 1 is a circuit block diagram of a set-up for carrying out the method of the invention in a first embodiment thereof.

In the diagram of FIG. 1, there are shown a television camera tube 1 having a signal electrode 2 and a focussing coil 3. Directly in front of the signal electrode 2 is a filter wheel 4 by which various gray filters can be swung into the path of the light incident on the signal electrode of the tube. In one of the holders of the filter wheel, an opaque plate is provided instead of a gray filter, so that with it the incident light from outside the tube can be completely excluded. An amplifier 6 is connected to the signal electrode 2 for amplifying the video signal that is produced. This amplified video signal then appears at the output 7 where it is made available for further processing.

A measurement circuit 8 connected to the camera output amplifier 6 is provided for carrying the equilibration focussing adjustment according to the invention. The measurement circuit 8 is connected to an analog-to-digital converter 9, at the output of which a digital measurement value is available for processing in a comparative evaluation circuit 10. This circuit 10 consists essentially of a process control stage 11, a storage unit 12 and a digital-to-analog converter 13.

In the process control stage 11, the digital measurement values provided by the analog-to-digital converter 9 are compared with the immediately preceding value already stored in the storage unit 12 and a new setting value is derived therefrom and likewise stored. The new digital setting value, after digital-to-analog conversion in the converter 13, is provided as an analog setting value for the focus control 14, so that the focussing current for the focussing coil 3 can thereby be correspondingly controlled. The control produced in this fashion in accordance with the invention operates in the direction which will minimize the beam spot of the electron beam on the signal electrode.

The process control stage 11 is also connected to a grid voltage control 16 for modifying the grid bias of the camera tube 1. The camera tube 1 is equipped with a light source 17 which serves in a known manner for bias lighting of the signal electrode 2.

A first embodiment of the method of the invention will now be explained in connection with FIG. 2 which shows signals on three different lines designated by reference letters which also appear in FIG. 1 at the places where these signals are to be observed. During the entire performance of the method, the signal electrode 2 is illuminated with diffuse light, which can be provided either from outside the camera through one of the gray filter disks or, when the opaque disk is in place, by the built-in light source 17 provided for providing a biassing light level on the signal electrode 2.

First a digitally stored setting value, converted to an analog signal, is supplied to the focus control unit 14 which then executes a corresponding control of the focussing current of the camera tube. Thereafter, by means of the pulse signal on line a of FIG. 2, the camera tube grid control circuit 16 is affected so as to control the grid bias as follows: During each of the pulses (illustrated as positive pulses), the electron beam is interrupted and during the remaining time the signal electrode 2 is normally scanned by the electron beam.

Figure 2:
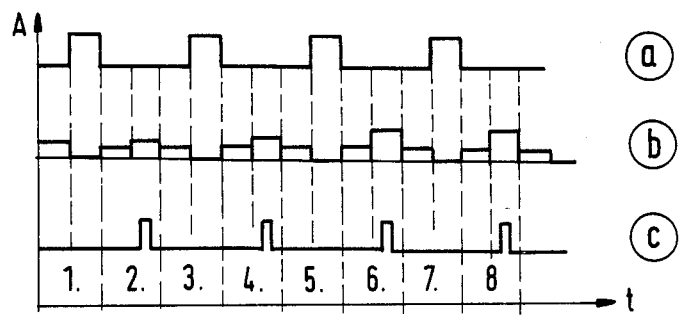
FIG. 2 is a timing diagram in the form of a graph of signals occurring in the system of FIG. 1 shown on a common time scale.

In the example shown in FIG. 2, the electron beam is interrupted for one picture field in alternate picture frames, but it is also possible just as well to interrupt the electron beam at intervals for a television line or for a section of a television line.

Departing from the theoretical scanning pattern relations, the beam spot in no case is limited to the lines of its currently intended (field) pattern—not even with the best focussing conditions. There is always present some overlapping of the two interlaced grids. In consequence each first field of a frame already profits from the preceding charge accumulation after a field scan and, in anticipation of the useful enhancement effect, the video signal level in this first field is already higher. In this level rise, however, a clear correlation with the sharpness of focus is difficult to find. Modification of the beam spot by changing the focus setting frequently leads to no visible change of the video level in this field.

In the second field of the frame related to the field already scanned, the situation is contrastingly different. Although the video level of this second field falls well short of reaching the expected nominal "two" level, because of the above-described general overlap of interlaced scanning grids and the anticipation of enhanced-level scanning, the correlation with the focussing condition in the previous field scan is clearly perceptible in this case. This difference between the first and second fields of a frame is enhanced when the focus-correlation effect is enhanced, as described further below, by intermittent vertical offsetting of the scanning lines of one field to superpose them on the scanning lines of the other field. It is accordingly preferred to detect the quality of focus of the beam exhibited by its scanning in a first field by measuring charge on unscanned portions of the first field during the scanning of a second field of a frame.

In the illustrated case, in accordance with the pulse signal a, the electron beam can normally scan the signal electrode 2 during the first field of the first frame (designated 1 on the bottom line of FIG. 2). In contrast thereto, it is suppressed during the second field of that frame, so that through the charge build-up, each of the lines of that field will not be erased.

At the output of the signal electrode 2 and similarly at the output of the amplifier 6, a signal corresponding to the line b of FIG. 2 appears. As shown, during the scanning of the signal electrode 2 in the first picture field, there is a certain video signal level and during the suppression of the electron beam in the second picture field, there is no video signal. After the scanning of the first picture field of picture frame 2, where a video signal level arises which is higher than that of the first picture field of picture frame 1, the second picture field of picture frame 2 is then scanned, as the result of which a signal value should be produced lying above the video signal level of the preceding first picture field of frame 1. In the ideal case, with optimal loss-free focussing, this signal value would have twice the value of the video signal level of the corresponding first picture field.

The method of the invention is based upon the fact that with ideal focussing the electron beam scans only its own line pattern, whereas a defocussed beam also partly scans the interlaced line pattern of the other picture field along with the lines of its own picture field and thereby takes off a partial discharge from the lines of the other picture field. By blanking the electron beam during the second field of frame 1 and scanning the second field of frame 2, a conclusion ca be drawn regarding the focussing or defocussing of the electron beam by reference to the video signal level then arising. A maximum signal level at this time corresponds to the optimum focussing condition of the electron beam.

In order to provide an automatic equilibration procedure, the video signal level is always measured by the measurement circuit 8 when a measurement pulse c (shown on the line c of FIG. 2) is present, in the illustrated case in the second field of the even-numbered frames. This value then is digitized by the converter 9 for further processing in the manner above described. If the level of the video signal produced (line b of FIG. 2) has not yet reached a maximum value—theoretically corresponding to a double value—after the conclusion of a measurement cycle spanning two frames, the measurement cycle is repeated again, or even several times, until for the second picture field this maximum value has substantially been reached, which in the illustrated case occurs in the sixth frame. At this stage the entire setting procedure is completed.

A variant of this method of setting the focussing adjustment utilizes measurement of the video signal in a time interval immediately following the suppression of the beam current and then compares the measured value with the previous measured value. In this case, the setting value for the focussing current is modified in the direction of minimizing the video signal in order to reduce the beam spot size.

Figure 3:
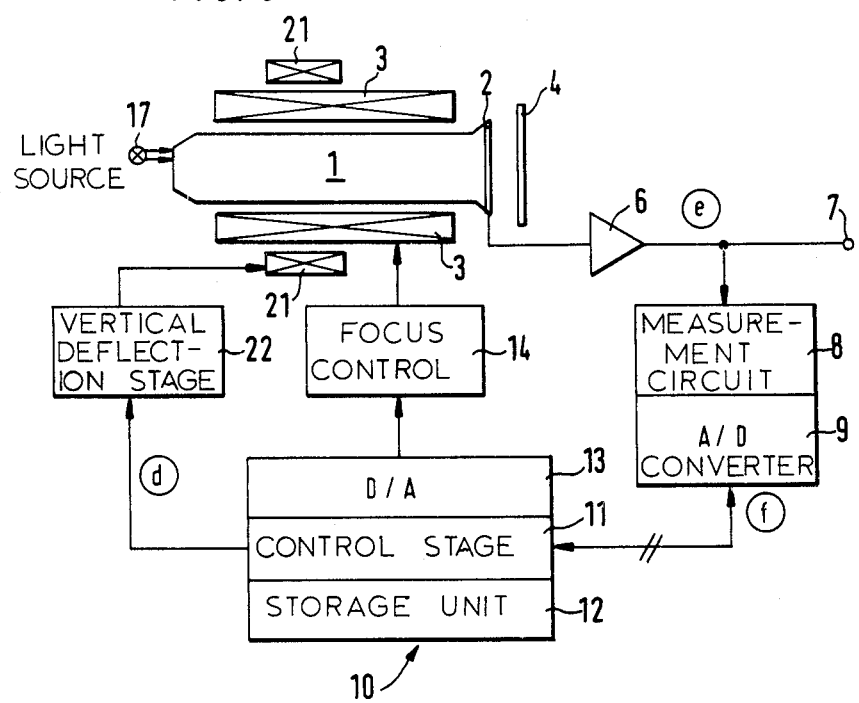
FIG. 3 is a circuit block diagram of a set-up for carrying out the method of the invention in a second embodiment thereof.
Figure 4:
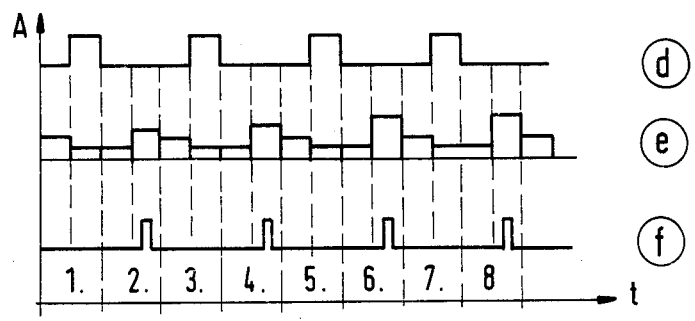
FIG. 4 is a timing diagram illustrating signals occurring in the system of FIG. 3.

The circuit according to FIG. 3 differs from the circuit according to FIG. 1 merely by the provision of a different scanning method. In this case, instead of the intermittent blanking of the electron beam, the scanning pattern of the second field is intermittently offset in the vertical direction in such a way that the pattern of the first and second fields are superimposed. This vertical offset of the scanning pattern is produced by means of the vertical deflection stage 22 controlling the vertical deflection coils 21. The vertical offset pulse d shown in FIG. 4 is supplied to the vertical deflection stage 22 by the process control stage 11. Then, for example, the first picture field is normally scanned, whereas in contrast the second picture field is shifted in the vertical direction by the pattern offset pulse onto the pattern lines of the first picture field. The first picture field of the second frame is thereafter scanned normally and likewise the second picture field of the second frame.

The video signal available at the output of the amplifier 6 accordingly has the level represented on line e of FIG. 4. If, for example, the value shown in FIG. 4 is obtained in the first field of the first frame, the levels of the following fields (second and third) are only half as great in the ideal case on account of the short integration time (for the signal electrode). Only in the fourth field (in the second field of the second frame) does a video signal appear that goes somewhat above the level of that of the first field of the first frame. This level of the fourth field is now measured upon appearance of the measurement pulse f, as in the case of the method of FIG. 1. This equilibration is then repeated for minimizing the beam spot until the video signal has reached its maximum value (for example in the sixth frame).

Although the invention has been described with reference to particular illustrative examples, it will be understood that variations and modifications are possible within the inventive concept.

I claim:

1. Equilibration method for focussing the electron beam of a television camera tube, said tube having beam focussing means and said beam having a spot size adjustable by said focussing means, said method comprising the steps of:

illuminating the signal electrode of the camera tube with diffuse light;

intermittently suppressing the electron beam of the picture tube during scanning for a first set of intervals related to predetermined locations on the signal electrode;

in certain time intervals of a second set of intervals corresponding to said locations which are interleaved with intervals of said first set, scanning with the beam instead of suppressing the beam and simultaneously measuring the video signal to produce a measurement value;

evaluating said measurement value by comparison with previous measurement values for determining a maximum value;

thereafter controlling the adjustment of said focussing means of the camera tube, by means of a control signal, towards reduction of the spot size of said beam and then repeating the steps of intermittent suppression of the beam, followed by scanning to obtain a measurement signal and subsequent adjustment by means of said control signal for minimizing the spot size of said beam.

2. Method according to claim 1, wherein the intermittent suppression of the electron beam is performed in alternate picture fields.

3. Method according to claim 1, wherein the intermittent suppression of the electron beam is performed in alternate lines within a picture field.

4. Method according to claim 1, wherein the intermittent suppression of the electron beam is performed in alternate segments within a television line.

5. Method according to claim 3, wherein following suppression of the electron beam within at least one picture field, the scanning by the electron beam for producing a measurement value is performed within the picture field which follows the next picture field within which the electron beam is suppressed, so that a measurement cycle spans at least two picture frames.

6. Method according to claim 1, wherein the suppression of the electron beam is performed by changing the grid bias of the camera tube.

7. Method according to claim 1, wherein the measurement during scanning of the electron beam is initiated by a measurement pulse.

8. Method according to claim 1, in which evaluation of said measurement value is performed by digitalizing and storing the measurement value, then comparing it with a previously stored measurement value, deriving from the comparison a new adjustment value for the focussing means and storing the same and then converting into analog form said new adjustment value and supplying it to said focussing means.

9. Method according to claim 1, wherein the raster scanning for producing a measurement value is performed under conditions of magnified line spacing.

10. Method according to claim 1, wherein the diffuse light with which the signal electrode is illuminated is provided by the bias lighting of the signal electrode provided in the camera during exclusion of light incident form the exterior of the camera.

11. Equilibration method for focussing the electron beam of a television camera tube, said tube having beam focussing means and said beam having spot size adjustable by said focussing means, said method comprising the steps of:

illuminating the signal electrode of the camera tube with diffuse light;

imtermittently suppressing the electron beam of the camera tube during scanning;

measuring the video signal in a time interval directly following the suppression of the electron beam;

evaluating said measurement value by comparison with previous measurement values for determining a minimum;

thereafter controlling the adjustment of the focussing means of the camera tube, by means of a control signal, in the direction of reducing the spot size of the beam, and thereafter repeating the steps of intermittent suppression of the electron beam, measuring a video signal to produce a measurement value, evaluation of said measurement value and control of focussing means adjustment by said control signal for minimizing the spot size of said beam.

12. Method according to claim 1, wherein the intermittent suppression of the electron beam is performed in alternate fields.

13. Method according to claim 11, wherein the intermittent suppression of the electron beam is performed in alternate lines within a picture field.

14. Method according to claim 11, wherein the intermittent suppression of the electron beam is performed in alternate segments within a television line.

15. Method according to claim 12, wherein following suppression of the electron beam within at least one picture field the scanning by the electron beam for producing a measurement value is performed within the picture field which follows the next picture field within which the electron beam is suppressed so that a measurement cycle spans at least two picture frames.

16. Method according to claim 11, wherein the suppression of the electron beam is performed by changing the grid bias of the camera tube.

17. Method according to claim 11, wherein the measurement during scanning of the electron beam is initiated by a measurement pulse.

18. Method according to claim 11, in which evaluation of said measurement value is performed by digitalizing and storing the measurement value, then comparing it with a previously stored measurement value, deriving from the comparison a new adjustment value for the focussing means and storing the same and then converting into analog form said new adjustment value and supplying it to said focussing means.

19. Method according to claim 11, wherein the raster scanning for producing a measurement value is performed under conditions of magnified line spacing.

20. Method according to claim 11, wherein the diffuse light with which the signal electrode is illuminated is provided by the bias lighting of the signal electrode provided in the camera during exclusion of light incident from the exterior of the camera.

21. Equilibration method for focussing the electron beam of a television camera tube, comprising the steps of:
illuminating the signal electrode of the camera tube with diffuse light;
offsetting the scanning pattern of a first field of the two fields of a picture frame, during scanning, onto the scanning pattern of the other field of said picture frame intermittently;
intermittently omitting the step of offsetting of the scanning pattern;
measuring the video signal produced at the signal electrode of the camera tube during omission of said scanning pattern offset while said first field is being scanned to produce a measurement signal;
evaluating said measurement signal by comparison with previous measurement values for finding a maximum;
thereafter controlling adjustment of focussing means of the camera tube by a control signal towards a diminution of the beam spot, and
repeating the steps of intermittent offsetting of scanning patterns, temporary omission of the scanning pattern offset, obtaining and evaluating a measurement signal during the temporary omission of the scanning pattern offset and controlling the control signal of the focussing means for minimizing a beam spot several times.

22. Method according to claim 21, wherein said first field scanning pattern is offset onto said second field scanning pattern in alternate video frames and measuring of said video signal is performed during the scanning of frames in which said first field scanning pattern is not offset.

23. Method according to claim 21, wherein the intermittent scanning pattern offset is performed linewise within a picture field.

24. Method according to claim 21, in which evaluation of said measurement value is performed by digitalizing and storing the measurement value, then comparing it with a previously stored measurement value, deriving from the comparison a new adjustment value for the focussing means and storing the same and then converting into analog form said new adjustment value and supplying it to said focussing means.

25. Method according to claim 21, wherein the raster scanning for producing a measurement value is performed under conditions of magnified line spacing.

26. Method according to claim 21, wherein the diffuse light with which the signal electrode is illuminated is provided by the bias lighting of the signal electrode provided in the camera during exclusion of light incident from the exterior of the camera.

* * * * *